United States Patent
Roy et al.

[15] 3,696,808
[45] Oct. 10, 1972

[54] METHOD AND SYSTEM FOR BRAIN WAVE ANALYSIS

[72] Inventors: John E. Roy, 3135 Netherland Avenue, Riverdale, N.Y. 10463; Robert Laupheimer, 68 Wilson Avenue, Westbury, N.Y. 11590

[22] Filed: Aug. 19, 1970

[21] Appl. No.: 65,050

Related U.S. Application Data

[63] Continuation-in-part of Ser. No. 748,330, July 29, 1968, abandoned.

[52] U.S. Cl. .............................128/2.1 B, 324/77 G
[51] Int. Cl. .................................................A61b 5/04
[58] Field of Search .128/2.1 R, 2.1 B, 2.1 A, 2.06 R, 128/2.06 V, 2.06 A; 324/83 D, 77 G

[56] References Cited

UNITED STATES PATENTS

| | | |
|---|---|---|
| 2,648,822 | 8/1953 | Walter.........................324/77 |
| 3,032,029 | 5/1962 | Cunningham...............128/2.1 |
| 3,087,487 | 4/1963 | Clynes......................128/2.1 B |
| 3,096,479 | 7/1963 | Marks et al...............324/77 G |
| 3,123,768 | 3/1964 | Burch et al. ............128/2.1 X |
| 3,222,598 | 12/1965 | Pollard ..................128/2.06 X |
| 3,286,176 | 11/1966 | Birnbolm.....................324/83 |
| 3,321,740 | 5/1967 | Lee..........................324/77 G |
| 3,381,220 | 4/1968 | Burr........................324/83 X |
| 3,413,546 | 11/1968 | Riehl et al. ..................324/77 |
| 3,416,083 | 12/1968 | Ray..............................324/83 |

OTHER PUBLICATIONS

McKinney, J. E., Journ. of Research of the Nat. Bureau of Standards, Vol. 71c, No. 3, July–Sept. 1967, pp. 227– 238.

Walter, W. G. Electronic Engineering, Nov. 1943, pp. 236– 240.

*Primary Examiner*—Kyle L. Howell
*Attorney*—Eliot S. Gerber

[57] ABSTRACT

A plurality of pairs of electrical contacts are applied to the head, the pairs being applied simultaneously or in sequence. Each pair of contacts is in bilateral symmetry. The brain waves from each pair of contacts are amplified and compared to provide a correlation coefficient between the signals. Preferably the correlation is obtained by an electric automatic polarity coincidence correlator. The correlation coefficient may be utilized as an aid in the diagnosis of certain types of brain injury.

21 Claims, 13 Drawing Figures

PATENTED OCT 10 1972 3,696,808

INVENTORS
E. ROY JOHN
ROBERT LAUPHEIMER

BY

*Eliot S. Gerber*
ATTORNEY

INVENTORS
E. ROY JOHN
ROBERT LAUPHEIMER

BY

*Eliot S. Gerber*
ATTORNEY

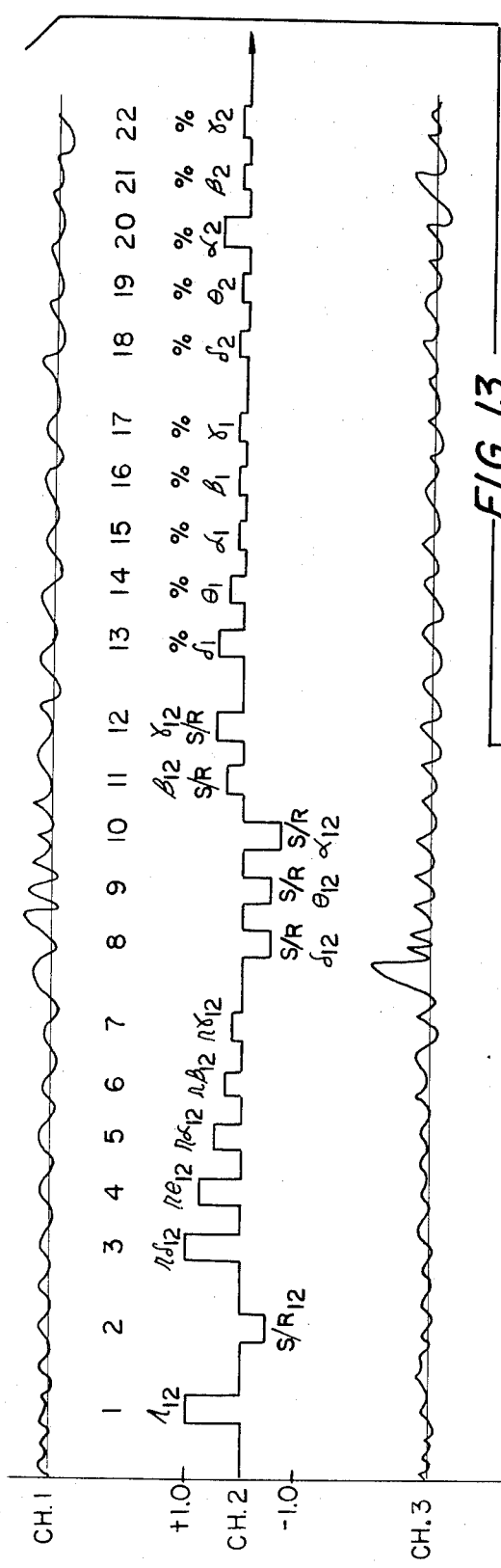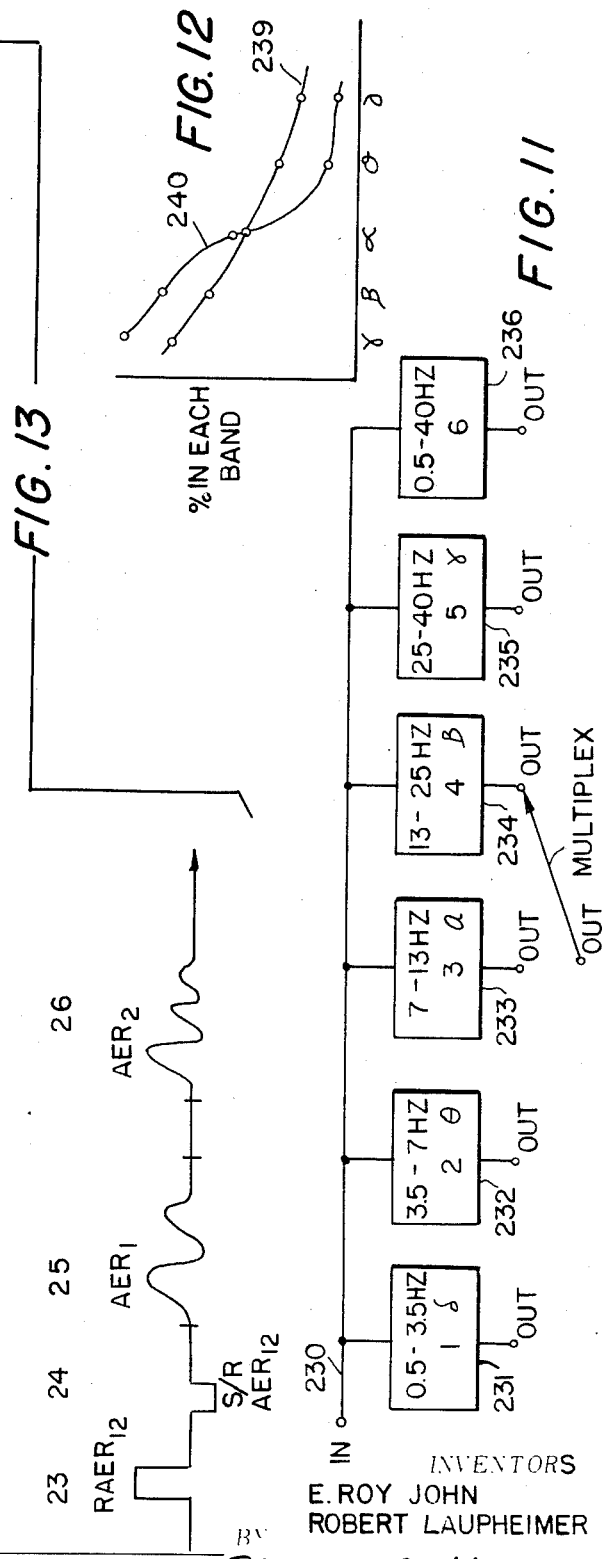

METHOD AND SYSTEM FOR BRAIN WAVE ANALYSIS

This application is a continuation-in-part of U.S. Application Ser. No. 748,330, filed July 29, 1968, entitled "Method and System for Brain Wave Analysis" now abandoned.

DESCRIPTION

The present invention relates to medical instrumentation and more particularly to an instrument for the analysis of brain waves.

The brain is probably the most complex, delicate and subtle part of a human being. It is difficult to detect and correctly diagnose brain injuries, even for those medical doctors who are specially trained in that field.

The brain produces electrical signals which can be picked up by an electrical contact or a probe attached to the surface or interior of the head. The signals are amplified and displayed by the movements of a pen on a paper in an EEG (electroencephalograph) apparatus. The brain waves (cortical response) may result from an external stimulus, i.e., an evoked response such as from flashing light.

Some neurologists, after long study and training, are able to study the records produced by an EEG apparatus and to recognize some forms of brain injury from those records. Generally, such neurologists operate on a pattern recognition or gestalt approach to the records and are able to associate specific wave patterns with specific forms or locations of injury. Such skilled neurologists are rare and there is not a sufficient number of them to conduct all the diagnoses which should be performed.

An EEG examination is not part of a routine medical examination. Consequently, sometimes brain tumors, epilepsy and other brain injuries are detected too late to cure or treat.

It is the objective of the present invention to provide an instrument for the automatic analysis of brain waves.

It is a further objective of the present invention to provide such an instrument which, because of its relatively low cost and ease of operation, may be utilized by medical personnel not having the extensive training of neurologists.

In accordance with the present invention, an instrument is provided for the automatic analysis of brain waves. This instrument is a substitute for the paper record of the EEG instrument and the analytical skill of the neurologist in interpreting that record. The instrument, in general, includes a pair of electrical contacts which are connected, for example externally, to a subject's head to pick up brain waves. The electrodes are placed in bilateral symmetric positions on the subject's head. The two signals are amplified by the instrument of the present invention and the signals are cross-correlated. The instrument provides, as its output, the cross-correlation coefficient of the two signals. That cross-correlation coefficient, depending upon the location of the contacts, is an indication of the proper functioning of the brain or of its injury.

Other objectives will be apparent from the following detailed description of a preferred embodiment of the invention, taken in conjunction with the accompanying drawings. In the drawings:

FIG. 11 is a block circuit diagram of the filters used in the system of FIG. 10;

FIG. 12 is a chart showing the distribution of energy in different frequency bands; and FIG. 13 is a sample of a chart produceable by the system of FIG. 10.

THE NEUROLOGICAL BASIS

Figure 1:
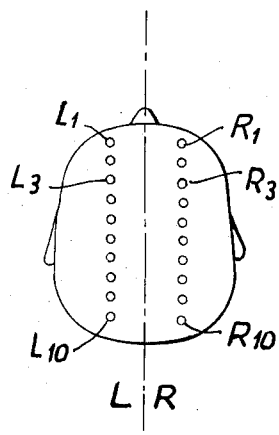
FIG. 1 shows, in a top plan view, the human skull with the positions of a series of pairs of electrical contacts.

The brains of a normal human being, and other animals, are physically symmetrical about a center line, i.e., they exhibit bilateral symmetry. This may be seen by viewing an exposed brain from the top, in which case the left and right sides are images of each other.

It has been discovered that the physical symmetry is reflected in a symmetry between some of the electrical waves produced at different parts of the brain. For example, two surface electrodes, such as suction cup contacts, can be placed on the head at symmetric points, the same distance on the left and right of the center line, as viewed from the top. The electrodes, in the normal brain, will detect electrical signals which are about the same shape, size and phase. This symmetry of the electrical brain waves may be due to the large commissural paths from one side of the brain to the other.

The employment of diagnoses in the present invention is illustrated in the following three examples:

EXAMPLE I.

The Detection of Brain Tumors

A brain tumor is a collection of cancerous cells. Such cells no longer perform the functions of normal cells, i.e., some of the normal tissue is effectively dead. Unless the tumor is detected early and treated, it may grow and cause disability or death. Generally a neurologist will test for the presence of a brain tumor by a series of reflex tests. It is presently very difficult, or impossible, to detect a brain tumor before it has grown sufficiently to impair some externally visible function, such as a reflex reaction.

However, it is also possible to detect a brain tumor by an analysis of brain waves. If two electrodes are placed symmetrically on the head, and the signal from one probe is weaker, but otherwise similar, than the signal from the second electrode, it may indicate brain damage caused by the presence of a tumor at, or near, the surface of the brain. The side producing the weaker signal is the side which has suffered damage. The probes may be placed, for example, one on each side at twenty locations $L_1 \ldots _{10}$ and $R_1 \ldots _{10}$, see FIG. 1. If a signal, for example from $L_3$, is weaker than the signal from $R_3$, it may indicate a tumor at or near the surface. If the tumor is buried deeper in the brain, there are two effects which may be produced. The first, the signal is weaker, and secondly the signal is delayed (out-of-phase) compared to the signal from the symmetrically positioned probe.

EXAMPLE II.

The Diagnosis of Epilepsy

Epilepsy is a brain injury characterized by paroxysmally recurring impairment of consciousness and perturbation of the automatic nervous system. Its diagnosis in severe cases may be relatively simple as the symptoms of an epileptic seizure may be pronounced and readily recognized. However, milder cases may be undetected for long periods or incorrectly diagnosed. The symptoms of such milder cases, particularly in children, may be confused with lack of attention and laziness, especially if the child is examined only by a school nurse.

Epilepsy produces distinctive electrical brain waves which may be detected and diagnosed utilizing the instruments of the present invention. In epileptogenic foci, the tissue becomes a generator of an electrical signal. The signal is not a simple wave form but is usually a sustained high-frequency discharge. When compared to the normal brain waves, such discharges may be considered as a form of noise. A patient having an advanced epileptogenic focus, even when resting, produces brain waves with a high noise content. The same phenomena of noise in the brain waves may be produced by a driven (evoked) response, for example, by a photic stimulation of flashing lights before the patient.

Figure 2:
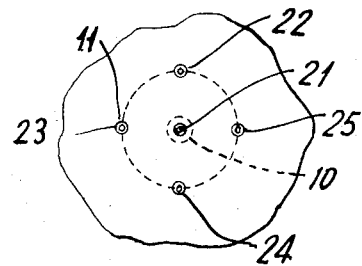
FIG. 2 shows, in top plan view, a portion of the human skull.

If the epileptogenic focus is on the surface of the brain, it produces noise which carries, with a travel time delay, to other surface areas of the brain. As shown in FIG. 2, if the brain has an epileptogenic focus 10, its noise may be termed $F(t)$. The noise at a point 11, removed from the focus 10, is $G(t+\Delta t)$ where $\Delta t$ is the travel time of the noise.

A procedure to determine the location of an epileptogenic focus is as follows: A bilateral symmetric set of areas on the brain is established, labeled in FIG. 1 Left 1 ... 10 and Right 1 ... 10. Probes are applied to the surfaces of each area and the electrical waves from symmetric pairs of probes are sampled to determine the correlation coefficient of each pair, $L_1$ to $R_1$, $L_2$ to $R_2$ ... and $L_{10}$ to $R_{10}$. If the correlation coefficient $r$ is about 1, then there would not be any evidence of an epileptogenic focus. If one pair of probes, for example, $L_5$ and $R_5$, has a correlation coefficient $r$ of less than 0.8, then it may be due to noise at $L_5$ or $R_5$ from an epileptogenic focus and further investigation is warranted. For such a further investigation, the electrode probes are placed, as indicated in FIG. 2, in a pattern around the area where the original probe $L_5$ was positioned. A delay is then introduced at the signal input at probe 25 and the signal from probe 25 (with the delay) is correlated with the signal from probe 21. If the correlation coefficient $r$ is about 1, then it is indicated that the epileptogenic focus is at probe 21. Similar correlations, with delays, are taken at the other probes 21–25. The delays are adjustable so that a number of such charts may be constructed. If the probes are 21, 22, 23, 24 and 25, and $d$ indicates delay and $r$ indicates a high correlation coefficient, and $n$ indicates a low correlation, two charts would be as follows:

| probe | $d_1$ (delay 1) 21 | 22 | 23 | 24 | 25 | $d_2$ (delay 2) 21 | 22 | 23 | 24 | 25 |
|---|---|---|---|---|---|---|---|---|---|---|
| 21 |   | r | r |   | r r | 21 |   | n | n |   | n n |
| 22 | r |   | n |   | n n | 22 | n |   | n |   | n n |
| 23 | r | n |   |   | n n | 23 | n | n |   |   | n n |
| 24 | r | n | n |   | n | 24 | n | n | n |   | n |
| 25 | r | n | n | n |   | 25 | n | n | n | n |   |

The two charts indicate that the center of the epileptogenic focus is at probe 21 with $d_1$.

If the charts should show that, even over the range of delays, it is not possible to obtain a high correlation, it is an indication of a buried epileptogenic focus. Such a deep focus is seen, at the brain surface, as a relatively large area of generated noise.

EXAMPLE III.

The Diagnosis of Schizophrenia

Schizophrenia (dementia praecox) is a type of personality disorder (psychosis) involving unrealistic responses to the environment. It has long been theorized that some type of schizophrenia might be potentially subject to diagnosis through a chemical analysis of the blood or other body constituents. Reports have been made of occasional successes at such chemical analyses. However, the individual reports have not been verified in other laboratories. At the present time, consequently, the diagnosis of schizophrenia is made primarily in terms of the external symptoms of personality disorder.

Some years ago it was theorized that there was some connection between schizophrenia and damage to the frontal lobes of the brain. At that time, operations known as frontal lolartomies were performed in a few serious cases of schizophrenia. The operation had the effect of severing the frontal lobes from the remainder of the brain. The operation was regarded by many as a dangerous experimental procedure and it has generally ceased to be performed.

Tests have now been conducted which indicate that schizophrenia may be diagnosed by an analysis of electrical brain waves. The electrical brain waves, as in the previous examples, are correlated on the basis of a bilateral symmetry by a series of pairs of electrical probes, the probes being positioned, in sequence or simultaneously, from the front of the brain to the rear. The testing procedure is to place a series of bilateral symmetric probes at the exterior of the patient's head. Each pair of probes, one on the left and one on the right, is then sampled for its signal content. The signals are then cross-correlated and their correlation coefficient derived. The correlations take place under a stimulated response such as the flashing of a light.

An indication of schizophrenia is a relatively low cross-correlation coefficient between the signals arising from the symmetrically positioned probes at the front part of the brain. As shown in FIG. 1, the probes, for example $L_1$, $R_1$, $L_2$, $R_2$ and $L_3$, $R_3$ would have a cross-correlation coefficient $r$ of less than 0.8. This asymmetric signal behavior arising at the frontal part of the brain may be regarded as being as characteristic of schizophrenic patients as their traditional personality disorder behavior patterns. Other methods of brain wave analysis, not based upon correlation analysis, have provided unconclusive results, see Greenberg-Pollack, "Clinical Correlates 14 and 6 Sec. Positive Spiking in Schizophrenic Patients", 20 Electroencephalograpy and Clinical Neurophysicology 197 (1966).

TYPES OF CORRELATION COEFFICIENT

The present invention contemplates the use of various types of electrical circuitry providing an automatic cross-correlation coefficient between bilaterally symmetrically positioned probes on the exterior of the brain or implanted.

The general cross-correlation function for two independent signals $X(t)$ and $Y(t)$ of the independent variable $t_1$, which is generally time, may be represented as:

$$\frac{1}{2T} \int_{-T}^{+T} X(t) \cdot Y(t) dt$$

In polarity coincidence only the polarity (sign) of each of the two signals is taken into account.

Preferably the correlation coefficient utilized is the polarity correlation. The polarity correlation enables the correlating instrument to be relatively inexpensive, relatively easy to manipulate, and small in size. In addition, there is a biological basis justifying the use of polarity correlation. If the brain wave is positive with respect to a given reference, the biological interpretation is that an increase in the rate of firing of neurons in the region of the probe has occurred. Conversely, if the brain wave is negative, with respect to the same reference, the biological implication is that there is an inhibition in the increase, i.e., a decrease, in the rate of firing of neurons in the same region. If two bilaterally symmetric probes are considered, for example $L_1$ and $R_1$, then if both are positive at the same instant, regardless of the amplitude and the rate of their signals, they have the same polarity. This would indicate, if the polarities are both positive at the same instant, that there is a similar increase in the rate of firing of neurons in both regions of the probes $L_1$ and $R_1$.

Other types of correlation coefficient circuits, however, may be used in the present invention in place of the polarity coincidence circuit, which is specifically described. The other types of coincidence circuits which may also be used include the Pearson Product Moment Correlation Coefficient, the Auto Correlation Coefficient, and the Veltmann Correlation Coefficient. These correlation coefficients, for example, the Pearson Product Moment Correlation Coefficient, are more accurate than the relatively simple polarity correlation. The Pearson Product Moment Correlation correlates not only the polarity of two signals (as does the polarity correlation circuit) but, in addition, correlates their amplitude and rate.

AUTOMATIC ELECTRONIC CORRELATION SYSTEMS

Figure 3:
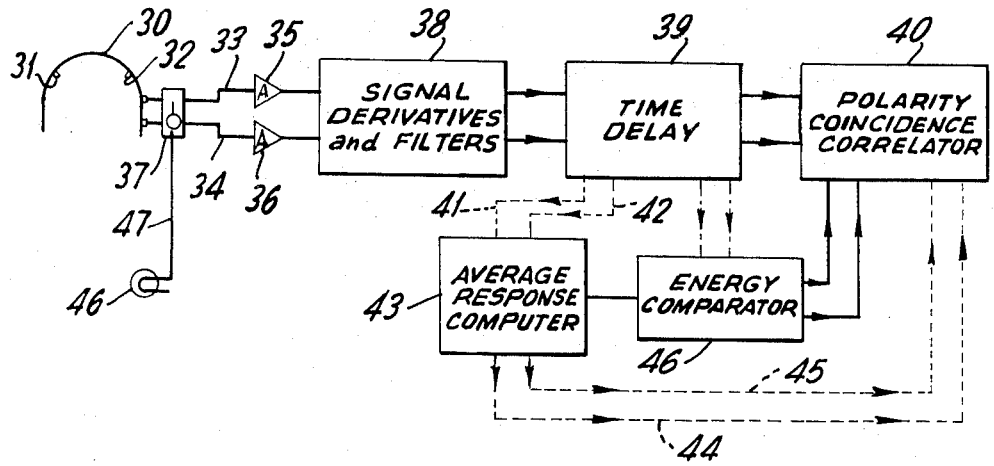
FIG. 3 is a block diagram of the first embodiment of the instrument of the present invention.

The system, as shown in FIG. 3, includes a helmet 30 which has a number of pairs of probes. For simplicity, only probes 31 and 32 are shown. Electrical contacts (probes) 31 and 32 are connected to output wires 33 and 34 having signal amplifiers 35 and 36, respectively. The other probes, by the gauged switch 37 can, in sequence, be connected to wires 33 and 34. The contacts 31 and 32 are arranged in bilateral symmetry on the head of the subject. The amplifiers 35 and 36 are connected to signal derivatives and filters component 38 which can provide the first derivate $dv/dt$ and the second derivate $d^2V/dt^2$ of the signals from amplifiers 35 and 36.

The filters in component 38 are electrical filters which may be switched into the circuit, selectively, to cancel out undesired frequency sub-bands in the signals. In effect, one may, by cancellation of all the other frequency sub-bands, select a certain frequency sub-band to examine at one time. For example, an evoked response may be stimulated at a certain frequency and the subject will respond at the same frequency. The resulting brain waves may be considered to be in a phase-locked oscillation with the stimulating signal. The filters of component 38 may be switched to pass only the frequency of the stimulating signal. As another example, the low frequencies of the normal brain wave rhythms (resting on-going activity) may be eliminated by the filters. Preferably, the filter system includes, as sub-units which may be switched into the two signals' paths, (1) an adjustable LOW-pass filter to attenuate predetermined frequencies above about 10–100 cycles, and (2) a high-pass filter. In addition, the filters may be switched so that they are connected in series with the derivative circuits to provide, for example, the first derivative of the signal from the two low-pass filters, i.e., $LP_{Left}dv/dt$ and $LP_{Right}dv/dt$.

Figure 5:
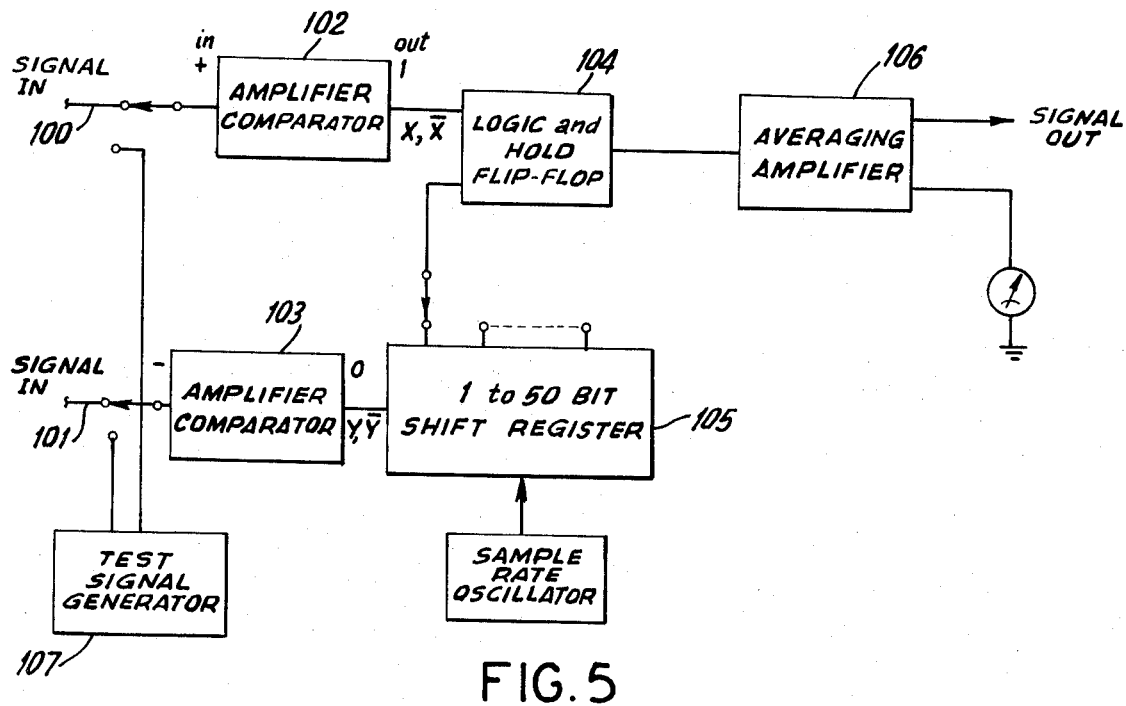
FIGS. 5, 6 and 7 are schematic circuit diagrams of the polarity coincidence correlator of the present invention.

The pair of signals from component 38 are connected to time-delay device 39 which, by proper setting, may provide a selected delay to either signal. The time delays are preselected to be generally in the range 0 to 200 m secs. The signals are then led to the polarity coincidence correlator 40 which provides a correlation coefficient of the two signals. As an alternative, the signals from time-delay device 39 are fed, by lines 41 and 42, to an average response computer 43. The computer 43, in effect, adds up a number of signals over time to promote two averaged signals which are fed, by wires 44 and 45, to the coincidence correlator 40. As another alternative, not shown, the pair of signals may be computed by the average response computer before being connected to the time-delay device 39 and the polarity coincidence correlator 40, in series. An energy comparator 46 may be used, for example after time-delay 39 and before the polarity coincidence correlator 40. The detailed circuit schematic for a suitable polarity coincidence correlator is shown in FIG. 5.

The overall system shown in FIG. 3 provides great flexibility. The various units, depending upon the desired result, may be utilized in various sequences and combinations by simply switching the inputs and outputs, for example, by switching means.

A driving stimulator 47a, shown as a photic source, is connected by line 47 to the switch 37. The switch 37 may be operated to simultaneously gate the signals from the probes and to operate the driving stimulator 47a. The subject reacts with a cortinal response to the photic stimulation of stimulator 47a.

Figure 4:
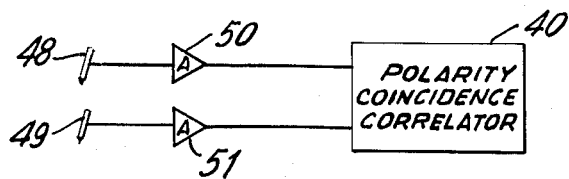
FIG. 4 is a block diagram of the second embodiment of the instrument of the present invention.

The system of FIG. 4 includes the polarity coincidence correlator 40 of FIG. 3. Two electrical contacts 48 and 49 are connected to amplifiers 50 and 51 respectively. The amplifiers are connected to the correlator 40. The contacts 48 and 49 are positioned, in sequence, in bilateral symmetry on the subject's head. The correlator 40 provides, as its read-out, the polarity cross-correlation coefficient of the brain waves detected by the contacts 48 and 49.

A block schematic diagram of the electronic system of the polarity coincidence counter is shown in FIG. 5. The two signals from the two electrical contacts 31 and 30 are received on lines 100 and 101. The signals on lines 100 and 101 are transmitted to respective amplifier comparator 102 and amplifier comparator 103. The amplifier comparators 102 and 103 perform the function of changing the positive or negative characteristic of the signals to a "one" to "zero" binary digit. They are, in effect, zero voltage crossing detectors. If the signal is positive, then the amplifier comparator will produce a "one" digit. If the input signal is negative, it will produce a "zero" digit. The digits produced by amplifier comparator 102 and amplifier comparator 103 are compared by the logic and hold flip-flop 104. The logic and hold flip-flop 104 may compare the signals directly or, to obtain a delay, as described below, may compare the digits stored in the bit shift register 105 with the digits directly obtained from an amplifier comparator. The compared product from flip-flop 104 is transmitted to the averaging amplifier 106 which produces the resulting signal.

Figure 6:
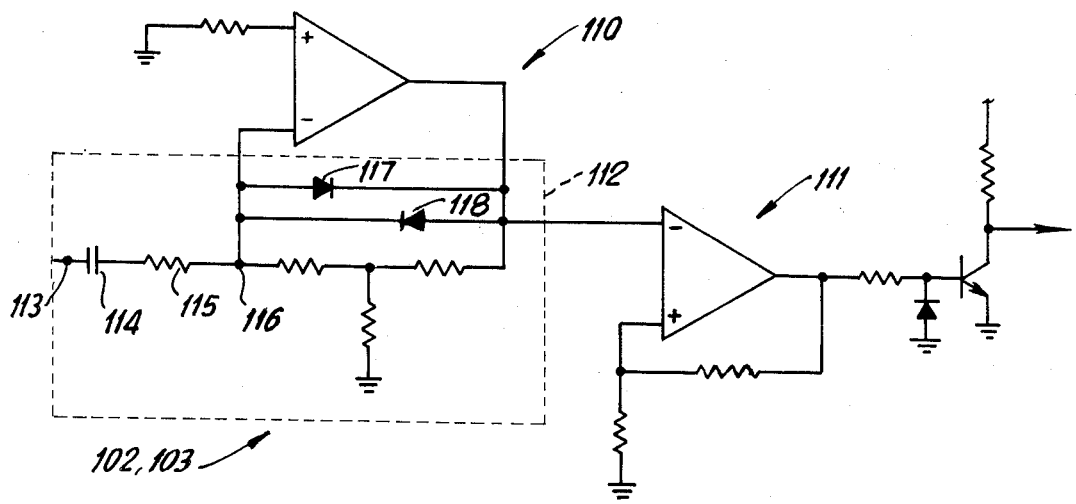

The amplifier comparators 102 and 103 are shown in FIG. 6. The amplifier comparators 102 and 103, only one of which is shown for simplicity, consists of two amplifying units 110 and 111 in tandem. The two amplifying units may be produced as a single integrated circuit. For example, the integrated circuit Motorola Type MC 1435 P is a suitable integrated circuit for this purpose. It is a monolithic silicon integrated circuit consisting of dual operational amplifiers produced by an epitaxial passivated method. It has high open loop gain $A_{VOL}$ of about 7000.

The input sub-circuit 112 of amplifier unit 110 provides a relatively constant a.c. coupling which provides a linear input impedance at input point 113. This input impedance is independent of wave form. The input signal may range from a low of 10 millivolts to a high of a few hundreds of volts. The capacitor 114, in series with one megohm resistor 115, is connected to point 116. If the input signal is small, the diodes 117 and 118 will not conduct. The impedance at point 116 will be about 100 ohms. If the input signal is high, for example, 100 volts, the diodes 117 and 118 will conduct, causing the impedance at point 116 to be about zero. The impedance at point 113, consequently, is about the same regardless of the amplitude of the input signal. The diodes 117 and 118 are reversely poled as to each other and may be of the type IN 914.

The amplifier comparators 102 and 103 amplify the input signals and produce a digital signal. If the input signal is positive, they produce a "one"; and if the input signal is negative, they produce a "zero".

Figure 7:
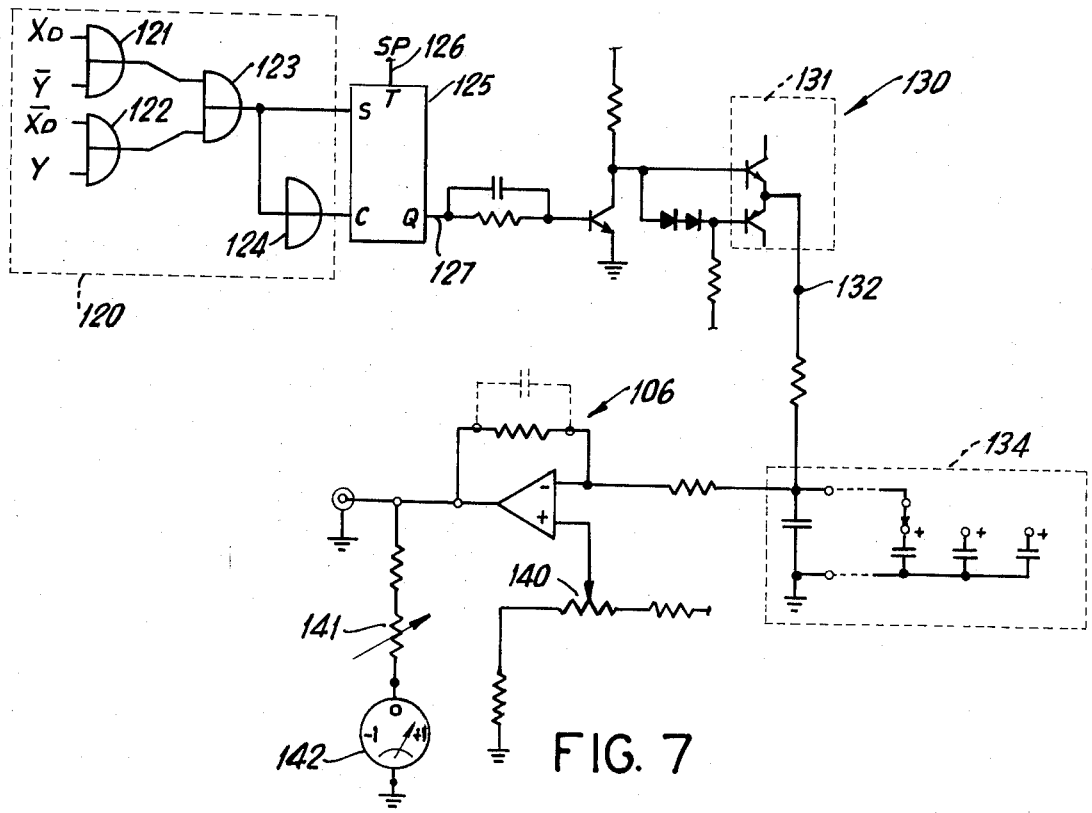

The binary digit from the amplifier comparator 102 is transmitted to the logic and hold flip-flop 104, the details of which are shown in FIG. 7.

The logic portion 120 of the logic and hold flip-flop 104 is an "exclusive or " logic circuit. In an "exclusive or " logic circuit, the only time that an output is produced is if there are simultaneously inputs at any of the gates but not simultaneous inputs at all of the gates. For example, if the gates are A and B, an output will be produced only if there is an input at gate A or at gate B, but not if there is an input at both gates A and B. A suitable "exclusive or" gate circuit may be based upon Motorola Type 717. The inputs to the first gate 121 are the "one" digit from the amplifier comparator 102 and the "zero" digit from the amplifier comparator 103. The inputs to the gate 122 are the "one" digit from the amplifier comparator 103 and the "zero" digit from the amplifier comparator 102. The gates 121 and 122 are connected to gate 123. Gate 123 is connected to a first terminal of the flip-flop 125 and also to a terminal of gate 124. The output of gate 124 is connected to the second input terminal of the flip-flop 125.

The flip-flop circuit 125 is a J-K flip-flop and may be of the type Motorola MC 726 P. The J-K flip-flop 125 provides a terminal 126 for a sampling pulse. The sampling pulse senses the state of the inputs of the flip-flop and transfers and stores them. The sample pulse in the present circuit may be switched from a sampling pulse of 1 KC to a sampling pulse of 10 KC.

The logic sub-circuit 120, together with the flip-flop 125, provide an output which is indicative of the coincidences of the polarities of the input signals. If both input signals are positive at the same time, then the flip-flop 125 is set and the output pulse at gate Q 127 is relatively positive. If, however, the input signals are of opposite polarities to each other, i.e., one is positive and the other is negative, then the flip-flop 125 is cleared and the gate Q 127 is at "zero" or is relatively negative.

The output from gate 127 is transmitted and inverted to a precision transistor switch 130. The switch 130 includes a positive source of voltage 131 which is set at 6 volts. The output of the precision switch is such that its output at point 132 is positive at 6 volts if the flip-flop 125 is cleared. If, however, the flip-flop 125 is set, then the switch 130 produces a zero voltage. The point 132 is an input to the amplifier 106. The input to the amplifier includes a smoothing circuit 134. The smoothing circuit includes three tantalum capacitors which are selected to be of 1 microfarad, 10 microfarads and 100 microfarads. These capacitors may be switched into the circuit alternatively, to provide, respectively, a smoothing of 10 milliseconds, 100 milliseconds and 1 second. The auxiliary circuits of amplifier 106 include a potentiometer 140 which provides a zero adjustment to the amplifier. The output of the amplifier 106 includes a potentiometer 141 which is utilized to calibrate the final meter 142. The meter, which provides the final result of the system, is set to operate between negative 1 volt and positive 1 volt. An indication on the meter of +1 volt means that the two signals are at the same polarity at the same time, that is, they are either both positive or both negative simultaneously. An indication of −1 volt means that the two signals are of opposite polarity, that is, that one is negative while the other is positive. An indication on the meter of zero indicates that the two signals on the average, are of opposite polarity. A calibration to obtain the correct meter reading is obtained by adjusting the plus positive voltage supply 131.

As mentioned above, in some situations it is of interest to compare the brain waves from one contact with the brain waves from the second contact with a predetermined delay. Such a delay is possible using delay lines, but such lines are usually large and expensive. The alternative, of the system of the present invention, is to digitalize the analog brain wave signals and then to delay the digital bits on one channel. Since it is only the polarity which is sampled, the digital representation of each of the brain waves on the two channels is a single "one" or "zero" on each channel. It is therefore necessary to delay only a single digital bit, by a predetermined amount, to compare it with the single bit from the other channel. Preferably, as illustrated in FIG. 5, a shift register 105 is used to store the digital bits. Preferably the shift register has 50 or 100 bit storage. A double switch is used to select the shifted bit to be compared. The first switch selects the decade and the second the unit. The shift register is preferably shifted with clock pulses that are the same as the sample rate of the flip-flop, i.e., 1 KC or 10 KC in the present example, although other rates may be used. If the shift register switches are set at 3 and 4, the delay will be 34 milliseconds at 1 KC and 3.4 milliseconds at 10 KC. With a 50-bit shift register, the user may select delays of 0–49 milliseconds at 1 KC and 0–4.9 milliseconds at 10 KC. The shift register should provide for parallel output so that any bit position may be utilized as the selected output. A suitable circuit may be obtained by arranging 50 flip-flop circuits in tandem in a 50-bit shift register.

The circuit shown in FIG. 5 also includes a test signal generator 107. Preferably the test signal generator is a gray code counter which generates pairs of signals which are equivalent to the "zero" or "one" binary digits. The test signal generator is utilized to test the functioning of the entire system.

Figure 8:
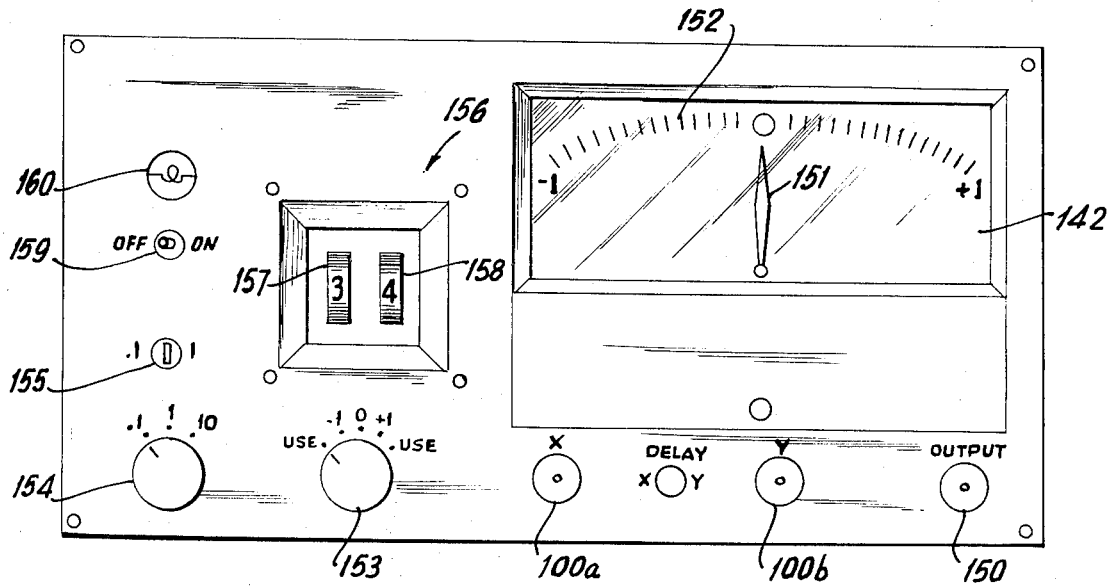
FIG. 8 is a front plan view of that preferred polarity coincidence correlator.

A preferred form of the device is illustrated in FIG. 8. The device includes the input terminals 100a and 101b which correspond to the input signals 100 and 101, respectively, of FIG. 5. A terminal jack 150 is also provided so that the various further tests illustrated in FIG. 3 may be performed. The meter 142 includes a movable pointer 151 and dial markings 152 which are shown from negative one volt to positive 1 volt. A dial 153 is used to either test the device or to place it into operation. As illustrated, the tests from the test signal generator 107 provide tests which indicate a negative one voltage, a zero voltage, or positive one voltage on the meter 142. A dial 154 is used to provide the time constants for the smoothing function. The time constants, as illustrated, are 0.1 millisecond, 1 milliseconds, and 10 milliseconds. The dial 154 switches alternatively one or the other of the capacitors of the smoothing circuit 134. A switch 155 may be placed in alternative positions for the delay multiplier. The delay multipliers are 0.1 and 1, which correspond to the sample pulse rate of 10 KC or 1 KC, respectively. The delay dialing system 156 includes a first rotatable dial 157 for the decade of the shift register and a second rotatable dial 158 for the units of the shift register. The on-off switch 159 and the on-off indicator lamp 160 complete the panel of the signal correlator.

Figure 10:
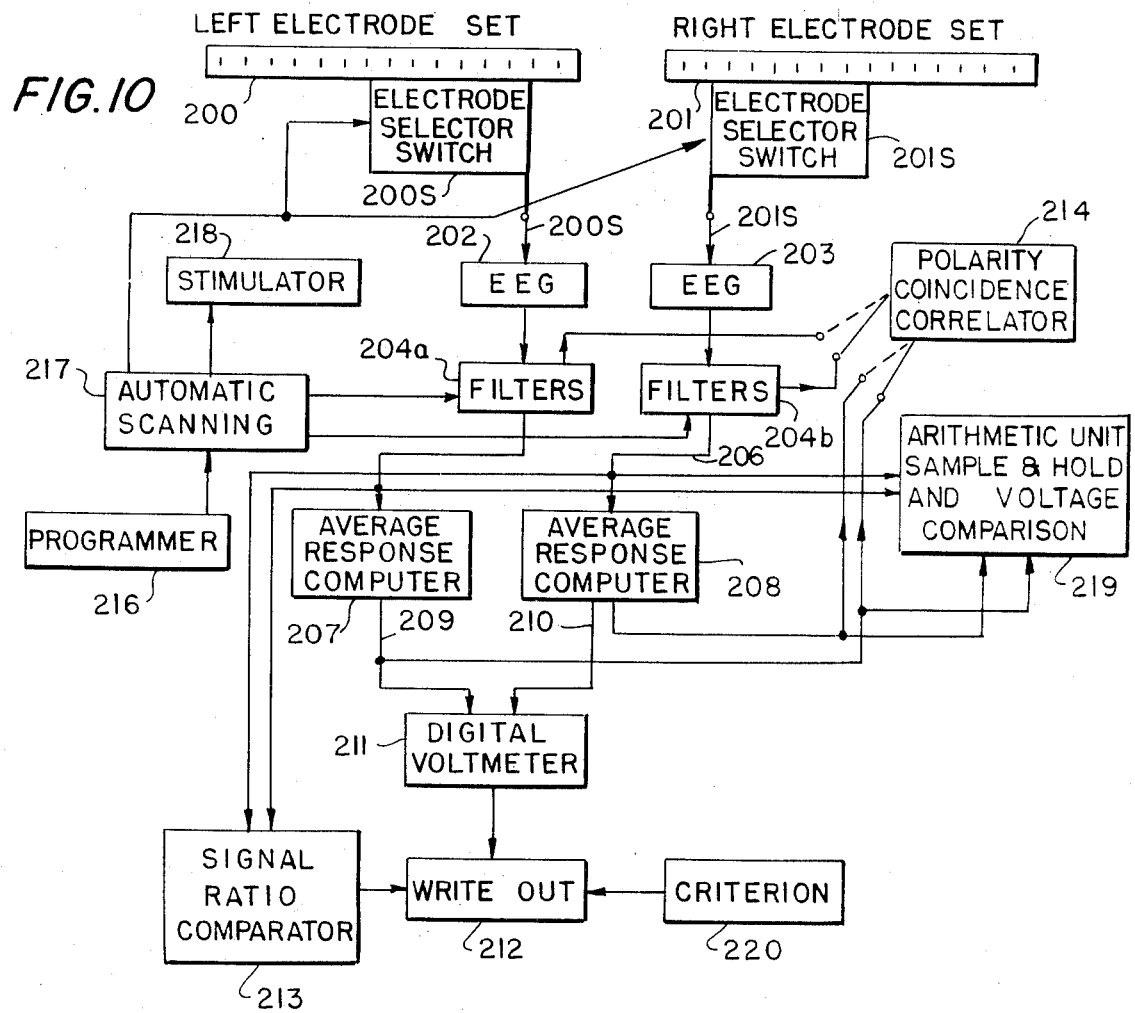
FIG. 10 is a block diagram of the neurological diagnosis system of the present invention.

The neurological diagnosis system is shown in FIG. 10. It consists of a set of electrodes 200 which is adapted to be connected to the left side of the brain, and a second set of electrodes 201 adapted to be connected to the brain on the right side in bilateral symmetry with the first set. Each of the electrode sets 200 and 201 is connected to a switch 200 S and 201 S, providing the capability to select any electrode from either set for analysis by the system. The outputs of these two switches are connected to respective electroencephalograph amplifiers 202 and 203 which are connected to sets of filters 204a and 204b. The filters 204a and 204b are electronic devices which act as band-pass filters. The filters are shown in more detail and discussed in connection with FIG. 11, which is a detailed explanation of the blocks 204a and 204b.

The filters 204a and 204b are connected by respective lines 205 and 206 to respective average response computers 207 and 208. The average response computers 207 and 208 are the same type of average response computer described previously, at 43 in FIG. 3. The output of the average response computers 207 and 208 is converted from a digital to an analog signal and connected by lines 209 and 210 to a digital voltmeter 211 which, in turn, is connected to the write-out device 212. The digital voltmeter 211 provides a visual indication of the voltage reading in digital numbers. The write-out device 212 may be the conventional type, for example, a series of marking pens or a Teletype, a trademark of the Teletype Corporation of Chicago. The filters 204a and 204b are also connected to signal ratio comparator 213 whose circuit and function has been described above in connection with FIG. 9. The polarity coincidence correlator (symmetry analyzer) 214 described previously may be connected to the output of the filters or to the output of the average response by means of the ganged switch 215. A programmer 216 is programmed, for example, by means of paper tape or punch cards or other programming means, to provide a series of stimuli to the patient whose evoked responses provide information. For example, the tests for epilepsy may consist of a certain planned program which would give a series of clicking sounds and lights, which stimuli are intended to invoke responses characteristic of the differentiation between patients who have epilepsy and normal patients.

The programmer 216 is connected to the automatic scanner 217 which is a switching mechanism.

One type of programming for the programmer 216 would be analog data recorded on a multi-channel tape. Tape recorders are now commercially available which will record 12–14 parallel channels of information, of an hour's duration, on a single reel. The automatic scanner 217 is connected to the stimulator 218 as well as to the electrode selector switches 200 S and 201 S and to the filters 204a and 204b. The stimulator 218 is preferably a shock stimulator, a light stimulator and a sound stimulator. An arithmetic unit 219 is provided for the functions of sampling and holding the information from the filters and also from the average response computers. The arithmetic unit makes a detailed comparison of the left side of the brain with the right side of the brain with respect to a variety of parameters (see below). A criterion unit 220 is connected to the write-out unit 212 so that, along with the write-out of electrical responses of the patient, the criteria for a normal response would appear on the same data sheet.

The filter units 204a and 204b are shown in greater detail in FIG. 11, which shows a single filter unit. In that unit a series of band-pass filters is connected to the single input line 230. The first filter 231 permits the passage of only those frequencies between 0.5 and 3.5 HZ. The second filter 232 permits the passage of only those frequencies between 3.5 to 7 HZ. Similarly the subsequent filters 233, 234 and 235 permit the passage of the respective frequencies 7 through 13 HZ, 13 through 25 HZ and 25 through 40 HZ. The final filter 236 is a relatively broad band filter which passes frequencies over the entire band-width of the filter, namely, 0.5 to 40 HZ. The total energy in the broad band filter 236 equals the energy at the filters labeled 1, 2, 3, 4 and 5, which are the particular frequencies associated with the Delta, Theta, Alpha, Beta and Gamma frequencies of electroencephalographic analysis.

The neurological diagnosis system provides the comparative energy of each of the frequencies and also provides a comparison of those energies at each frequency when two electrodes are connected with bilateral symmetry. It is able to compare the energies at each frequency and from each portion of the brain with a normal distribution of those energies under the same stimuli. The chart in FIG. 12 shows line 239 charting a normal distribution of energy in each of the bands corresponding to the band frequencies selected by the filter 231–236. In contrast, the example of line 240 gives an indication of an abnormal distribution of energy. As shown, the abnormal distribution 240 has a greater energy in the lower frequency bands and considerably less energy in the higher frequency bands than the normal distribution. These energy distributions are during and between each sequence of stimuli. The comparison of the percentage of energy within each frequency band in two symmetrically placed electrodes to the same series of stimuli is a sophisticated diagnostic tool for the diagnosis of conditions such as epilepsy or other forms of brain damage. As these energy distributions are being calculated, the average responses evoked in the two brain regions by the stimuli are being computed in the two average response computers. Detailed analysis of the symmetry of these average responses obtained from symmetrical electrodes provide further diagnostic information.

The diagnostic system of FIG. 10 is also capable of and is intended to, reveal other sophisticated and subtle brain wave patterns. For example, the system will hunt for the peaks in the average evoked response of the patient to a programmed series of stimuli, in order to ascertain if amplitudies and latencies of the peaks in both channels (the left channel and the right channel corresponding to the left and right side of the brain) are similar. If the peaks occur at a later time on one side of the brain than in the other, or are substantially different in size, it is an indication of pathology.

The programmer 216, which controls the automatic scanner 217, controls not only the stimulator 218 but also the filters and the automatic response computers. The filters may be selected by the programmer; for example, at certain times only a narrow band of frequencies may be permitted to pass through the filters to the signal ratio comparator and the polarity coincidence correlator, while the wide band signals were directed to the average response computers. Alternatively, the programmer 216 may by-pass the average response computers 207 and 208 and provide a digital comparison of the actual response voltage without averaging.

The arithmetic unit 219 provides to the digital voltmeter 211 and to the write-out 212 the ratio, at each electrode, of the energy within each frequency band to the energy over the entire frequency band, i.e., $$\alpha \frac{\text{band energy in electrode \#1}}{\text{total energy in electrode \#1}} = \%\alpha_{\text{E11}}$$

FIG. 13 is a sample of a chart produced by a three pen recording write-out device 212. The pen No. 1 is connected to the first electrode which is connected, for example, to the left side of the brain and gives the simple on-going raw electroencephalographic data. Similarly, pen No. 3, which is connected to the second electrode, for example, connected to the right side of the brain, likewise gives the raw on-going electroencephalographic data. Pen No. 2 is programmed by the programmer to give arithmetic results. Its first result is $R_{12}$, which is the correlation coefficient between the signal derived from the first electrode (connected to the left side of the brain) and the signal from the second electrode (connected to the corresponding position on the right side). $R_{12}$ provides a quantitative comparison of the similarity between the waveshapes of the signals from these two electrodes, independent of their strength. The second result, $S/R_{12}$, provides the ratio of the strengths of the two signals, independent of their waveshape. Results 3–7 are the correlation coefficients between the two signals with respect to the Delta band (3), Theta band (4), Alpha band (5), Beta band (6) and Gamma band. Results 8–12 are the ratios of strengths of the two signals in each of these five frequency bands. Results 13–17 are the percent of the energy of signal 1 contained in each of the five bands, while results 18–22 provide the same information about the frequency composition of the signal from the other electrode. Result 23 is the correlation coefficient between the average evoked responses from the two electrodes, stored in the two average response computers 207 and 208. Result 24 is the ratio of strength of those two average response waveshapes. Result 25 is the actual shape of the average evoked response from the first electrode and result 26 is the actual shape of the average evoked response from the second electrode, as stored in computers 207 and 208. After providing these outputs, the programmer 216 would switch to another pair of electrodes, and the cycle would repeat. A separate cycle is available for analysis of spontaneous EEG with no sensory stimulation, and resembles the foregoing except that read-outs 23–26 are not available.

Figure 9:
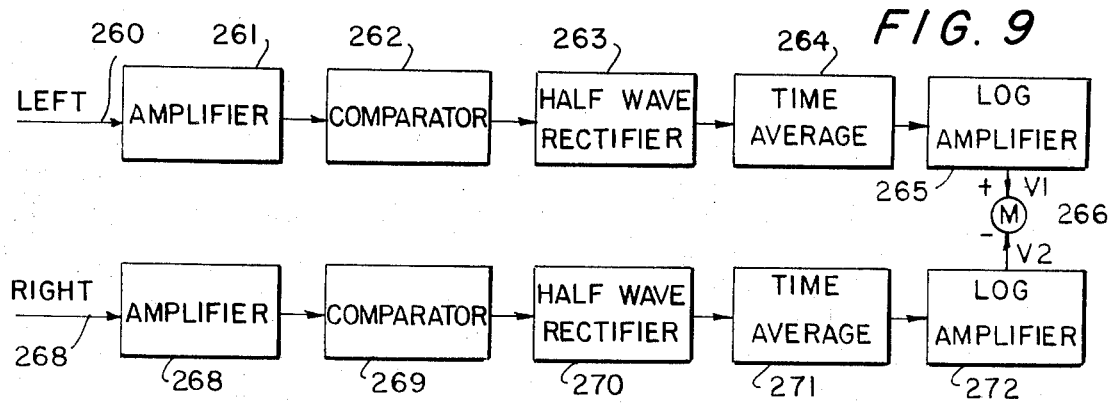
FIG. 9 is a block circuit diagram of the signal ratio comparator.

The signal ratio circuit of signal ratio comparator 213 is shown in FIG. 9. Its circuit is suitable for the energy comparator 46 of FIG. 3. It consists, in series, of an input line for one channel 260 (for example, connected to the left side of the brain), an amplifier 261, a comparator 262, a half-wave rectifier 263, a time average 264, a log amplifier 265 and a meter 266. The circuit also includes the input line for a second channel 267 (for example, connected to the right side of the brain), an amplifier 268, a comparator 269, a half-wave rectifier 270, a time averager 271 and a log amplifier 272 connected to the opposite side of meter 266. The time average is an operational amplifier, for example, Motorola integrated circuit MC 1432, and the log amplifier is also an operational amplifier, for example, Motorola integrated amplifier MC 1439 G.

The signal ratio is V1 (the strength of the signal on the first channel — for example the left side of the brain) to V2 (the strength of the signal on the second channel — for example the right side of the brain). The signal ratio V1/V2, in log signal ratio, is Log V1 − Log V2. The meter 266 is sensitive to the difference log V1 − log V2. The scale on the meter 266 is calibrated to reflect the log scale, which provides an indication of the signal ratio SR which equals: SR = $\log^{-1}$ (log V1 − log V2).

We claim:

1. The method of determining brain injury including the steps of attaching a pair of electrical contacts to the head of the subject, said contacts being in substantially bilateral symmetry on the head, obtaining a pair of signals from said contacts, which signals are the brain waves, amplifying said signals, and automatically calculating the correlation function of the said pair of signals by using said pair of signals in an electronic analyzing instrument.

2. The method of claim 1 wherein said contacts are external contacts applied to the scalp of the subject.

3. The method of claim 1 wherein said function is a polarity coincidence correlation.

4. The method of claim 1 wherein the brain waves are obtained simultaneously with a driven response.

5. The method of claim 4 wherein the driven response is obtained by photic stimulation.

6. A brain wave analyzing instrument including at least two electrical contacts adapted to be positioned in bilateral symmetry on the head of a subject, an amplifier connected to each of said contacts to amplify the brain waves detected by the said contacts, and means connected to both amplifiers for automatically and in real time providing the correlation function between the said amplifier brain waves.

7. The brain wave analyzing instrument of claim 6 wherein the correlation means is a polarity coincidence correlator.

8. The brain wave instrument of claim 7 wherein the correlator has two input channels, each of which channels includes a comparator to digitalize the polarity of the said brain waves.

9. The brain wave instrument of claim 8 and also including a digital shift register connected in one of the said channels and utilized as a time delay.

10. The brain wave instrument of claim 7 wherein the polarity coincidence correlator includes an "exclusive or" logic circuit and a flip-flop circuit in series.

11. The brain wave analyzing instrument of claim 6 wherein the instrument also includes a low-pass electronic filter connected to each amplifier in series with one of said contacts.

12. The brain wave analyzing instrument of claim 6 wherein the instrument also includes a high-pass filter connected to each amplifier in series with one of said contacts.

13. The brain wave analyzing instrument of claim 6 wherein the instrument also includes a derivative circuit connected to each amplifier in series with one of said contacts.

14. The brain wave analyzing instrument of claim 6 wherein the instrument also includes an integrating circuit connected to each amplifier in series with one of said contacts.

15. The brain wave analyzing instrument of claim 6 wherein the instrument also includes an average response computer connected between said amplifiers and said correlation means.

16. The brain wave analyzing instrument of claim 6 wherein the instrument also includes a time-delay circuit connected to each amplifier in series with one of said contacts.

17. The brain wave analyzing instrument of claim 6 and also including a signal ratio comparator connected to the two contacts, said signal ratio comparator having a channel connected to each contact and including in each channel a rectifier, a time averager and a log amplifier, said comparator also including a meter connected across the two channels.

18. A neurological diagnostic aiding system including a set of electrodes adapted to be positioned on a patient in bilaterally symmetrical placements to receive the patient's brain waves, switches to select two electrodes at a time, amplifiers connected to each switch, a filter circuit connected to said amplifiers to separate the amplified brain waves into pre-selected frequency bands, an average response computer connected to the said filter circuit, a stimulator adapted to provide stimuli to the patient and connected to said average response computer, a programmer to provide a sequential series of switching connections, said programmer being connected to the electrode switches, the filter circuit and to the stimulator, and means to provide a visual indication of the system's outputs connected to the average response computer.

19. A neurological diagnostic aiding system as in claim 18 wherein the visual indication means comprises a digital voltmeter and a pen recorder.

20. A neurological diagnostic aiding system as in claim 18 and also including a polarity coincidence circuit providing a correlation function when the electrodes are positioned in bilateral symmetry on the patient's head, said circuit being connected to the said electrodes.

21. A neurological diagnostic aiding system as in claim 18 and also including a signal ratio comparator which compares the energy, within each frequency band, from the two electrodes.

* * * * *

PO-1050
(5/69)

UNITED STATES PATENT OFFICE
CERTIFICATE OF CORRECTION

Patent No. __3,696,808__    Dated __October 10, 1972__

Inventor(s)__E. Roy John and Robert Laupheimer__

It is certified that error appears in the above-identified patent and that said Letters Patent are hereby corrected as shown below:

Page 1, column 1, heading, under "United States Patent"
        "Roy et al" changed to --John et al--

Page 1, column 1, under "Inventors" -
        "John E. Roy" changed to --E. Roy John--

Column 6, line 36, "LOW" changed to --low--

Column 11, line 39, "filter" changed to --filters--

Signed and sealed this 6th day of March 1973.

(SEAL)
Attest:

EDWARD M. FLETCHER, JR.　　　　　　ROBERT GOTTSCHALK
Attesting Officer　　　　　　　　　　Commissioner of Patents